Figure 1:
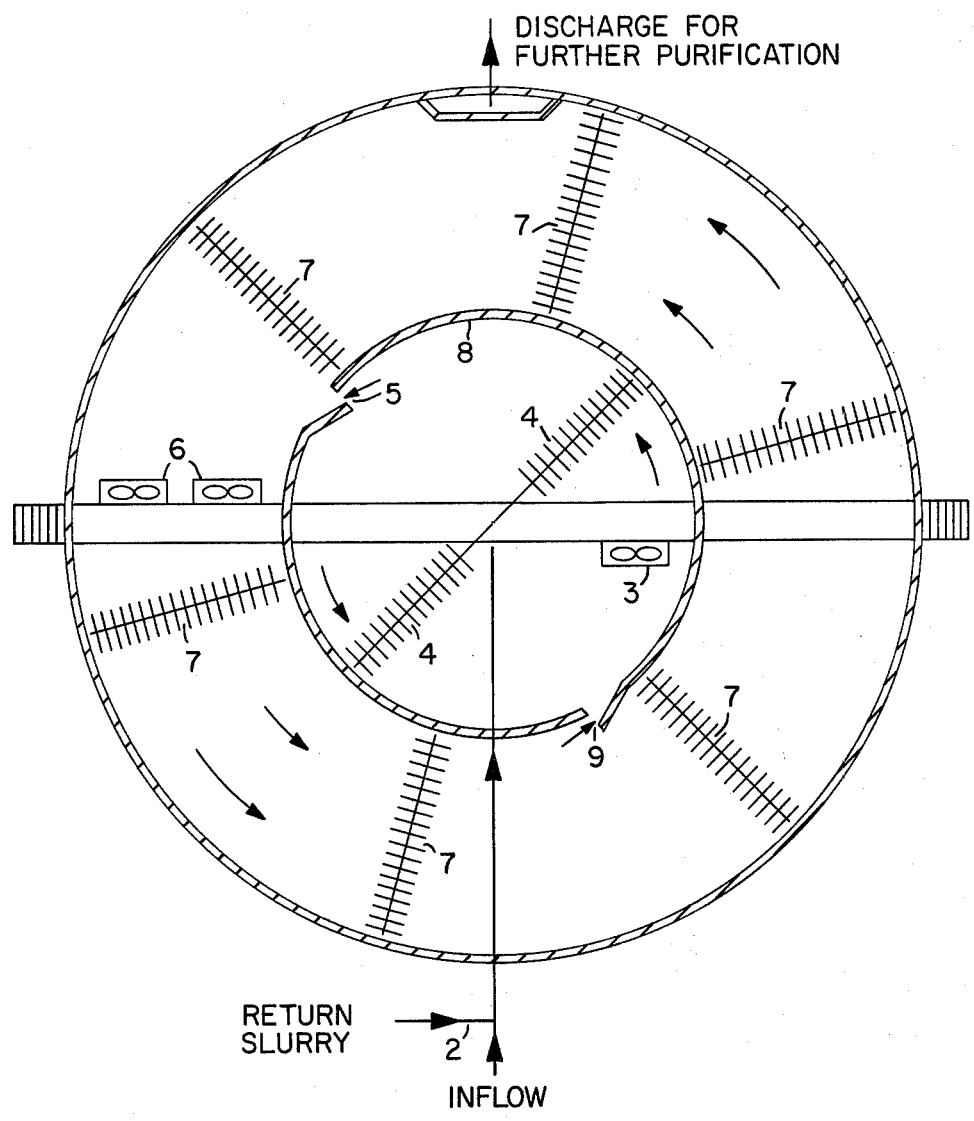

United States Patent [19]

Schneider et al.

[11] 4,452,700

[45] Jun. 5, 1984

[54] PROCESS FOR THE PERFORMANCE AND CONTROL OF CHEMICAL RESP. BIO-CHEMICAL REACTIONS

[76] Inventors: Norbert Schneider, Holbeinstr. 13, D 5657 Haan 1, Fed. Rep. of Germany; Jakob H. J. M. van der Graaf, Graaf van Burenstraat 26, NL 7411 RW Deventer, Netherlands; Jürgen Zink, Schilfweg 3, D 7000 Stuttgart-Hohenheim, Fed. Rep. of Germany

[21] Appl. No.: 135,282

[22] Filed: Mar. 31, 1980

[30] Foreign Application Priority Data

Apr. 2, 1979 [DE] Fed. Rep. of Germany ....... 2913132

[51] Int. Cl.³ .............................................. C02F 3/02
[52] U.S. Cl. .................................... 210/621; 210/629; 210/765
[58] Field of Search ............... 210/926, 621, 628, 629, 210/758, 765, 195.4, 256; 261/DIG. 75

[56] References Cited

U.S. PATENT DOCUMENTS

| | | | |
|---|---|---|---|
| 1,247,542 | 11/1917 | Jones | 210/926 X |
| 1,286,017 | 11/1918 | Jones | 210/926 X |
| 3,133,017 | 5/1964 | Lambeth | 210/629 X |
| 4,146,478 | 3/1979 | Rongred | 210/256 X |
| 4,231,874 | 11/1980 | Heilitag | |

*Primary Examiner*—Thomas G. Wyse
*Attorney, Agent, or Firm*—Marvin Bressler

[57] ABSTRACT

The invention provides a process for the performance and control of chemical or biochemical process cycles in two or a plurality of series-connected reaction stages or basins, with which gassing of a fluid is controllable. The process provides for a recirculation of the fluid between reaction stages or basins in that the basins are preferably arranged concentrically to one another, can be charged selectively, and have at least one connection between one another through which the fluid passes so that the contents of the basins are caused to assume a horizontal rotational flow. Recirculation of the fluid is provided by overflow dams, wall openings, or other devices.

11 Claims, 3 Drawing Figures

DISCHARGE FOR FURTHER PURIFICATION

RETURN SLURRY

INFLOW

PROCESS FOR THE PERFORMANCE AND CONTROL OF CHEMICAL RESP. BIO-CHEMICAL REACTIONS

The object of the invention is a process for the performance and control of chemical or biochemical process cycles in two or a plurality of series-connected reaction stages or basins and the attendant gassing of the fluid and recirculating of the fluid.

A process of this type is already known in the art in the biological purification of waste water to remove nitrogen. The requirement for further purification of waste water is frequently linked to an extensive elimination of nitrogen compounds. In the case of the process known in the art, this is accomplished in two basins which are arranged and connected in series in such a way that the inflow to this treatment stage, and the mixture of return slurry and water from the series-connected second basin, the activation basin, enters the first basin. The first basin is designed as a smaller chamber in which the fluid is maintained in motion by stirring. From here, the content flows into the preferably series-connected larger activation basin where the aerating of the waste water takes place. The recirculation is brought about by means of a pump that pumps the mixture of return slurry and water out of the activation basin into the first basin.

That process has quite a number of drawbacks. In addition to its relatively high construction cost resulting from the dimensioning of the structures for unilateral water or soil pressure, high operational costs result also from the revolving unit of the first basin and from the additional pumping cycle. At the same time, the rate of recirculation is defined by the pumping cycle.

It is the object of the invention to develop a process for the performance and control of chemical or biochemical process cycles for the said recirculation of the fluid and gassing of the fluid of the reaction stages, which is characterized by substantial savings in construction and operating costs, without reducing the operational capacity of the fluid recirculation.

In accordance with the invention, this object is accomplished by using container structures for the gassing of the fluid and the elimination of nitrogen. The container structures permit closed horizontal flow cycle of their contents. There can be circular or ring-shaped basins, ditch-type systems and the like. In accordance with the invention, in this case, two basins are arranged concentrically to one another as a result of which direct recirculation between the two basins is rendered possible by the fact that one or a plurality of connections are arranged between the basins in the form of weirs, flaps, deflectors, wall openings, or other passage openings/devices, or lines, arranged preferably on or in the container wall of the inner basin. Passage openings are formed also by the staggered arrangement of several partitions between the reaction stages or basins. Moreover, both basins have gassing capability controllable independently of one another.

Figure 2:
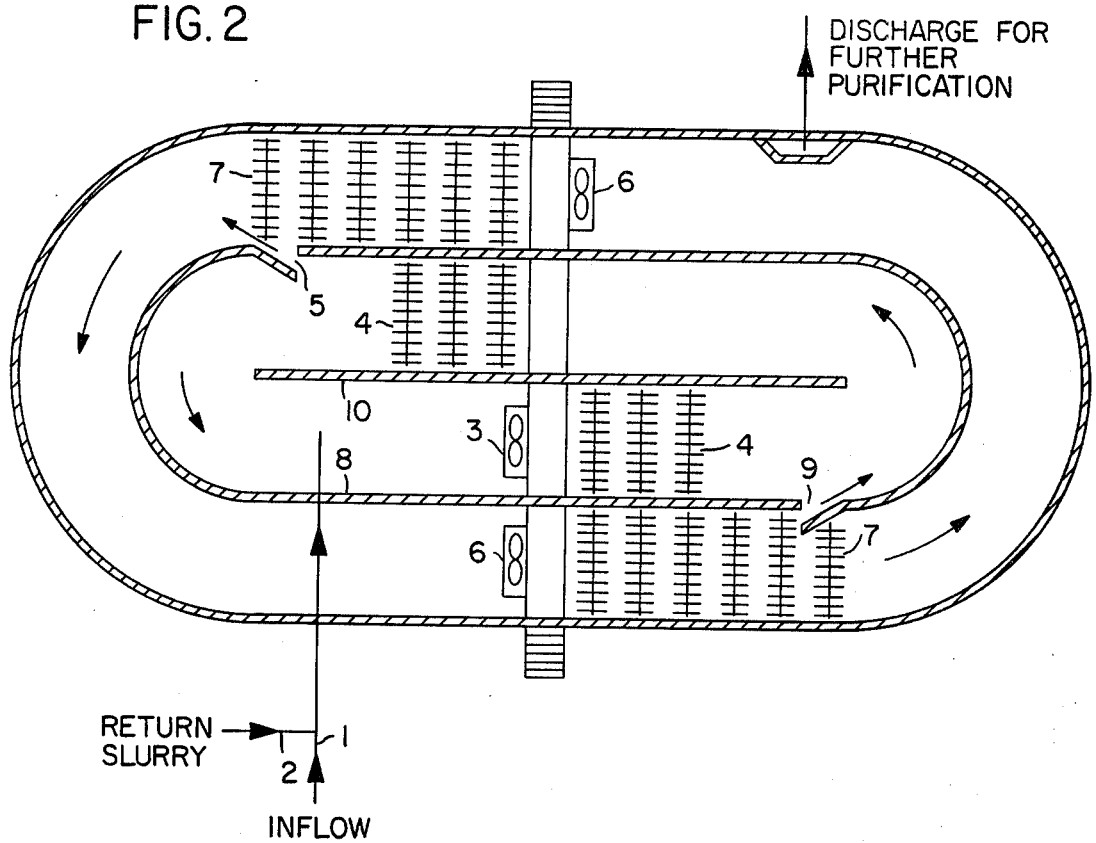
Figure 3:
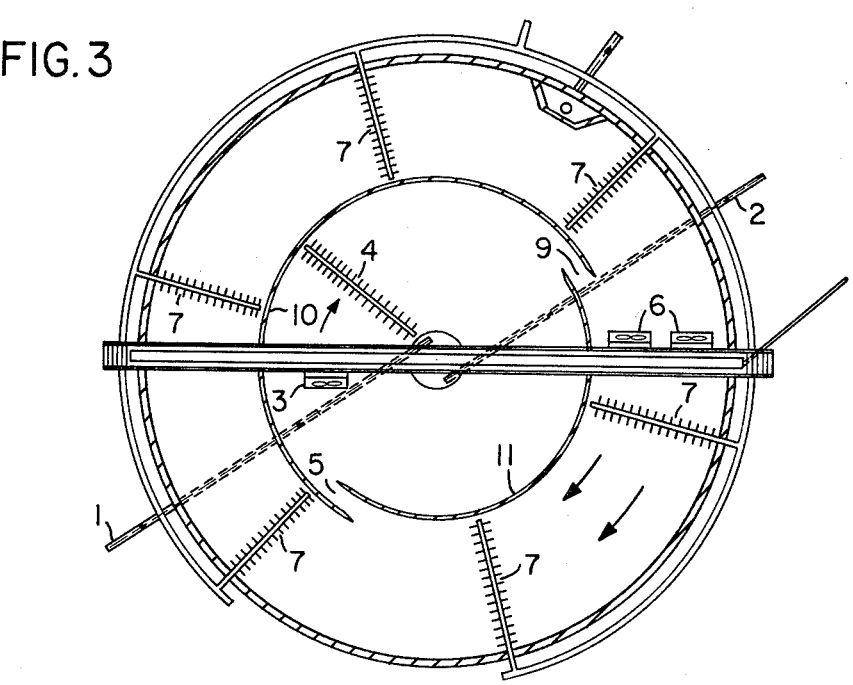

FIGS. 1 to 3 show schematically illustrated exemplified embodiments of the process.

FIG. 1: A combination of circular/ring-shaped basins. Inflow 1 and mixture 2 of return slurry and water are conducted into the central basin arranged concentrically in accordance with the invention. In the example described, a propeller 3, preferably a tubular one, provides for horizontal circulatory flow for the purpose of intermixing the container contents and for preventing deposits. Selectively, the contents of the basin can be aerated by vents 4.

Through one or a plurality of passage opening(s) 5 arranged in the container wall of the inner basin 8 and extending preferably down to the bottom of the basin, there flows into the outer basin as much fluid as corresponds to the product of the horizontal flow rate and the passage area.

In the outer basin, the fluid is accelerated horizontally preferably also by tubular propellers 6 and aerated in known manner by vents 7.

The recirculation into the inner basin is maintained in accordance with the invention in that the container wall of the inner basin 8 has also one or a plurality of passage openings 9 that extend preferably down to the bottom of the basin and through which the fluid can proceed from the outer basin into the inner basin. Owing to the dimensioning of the passage openings 5, 9, one can adjust practically any desired recirculation ratio. Additional energy for the recirculation is not required in view of the fact that the horizontal flow is available in any event for the purpose of eliminating deposits.

What does have a favorable effect on construction costs is the fact that the container wall of the inner basin 8 (with FIG. 2: 8, 10) does not have to be designed for unilateral soil or water pressure in view of the fact that the passage openings 5, 9 extend preferably down to the bottom of the basin and make possible an equalizing of the water level of the two basins.

The process in accordance with a invention gassing and for the recirculation of the fluid with two or a plurality of series-connected reaction stages or basins therefore offers substantial advantages, over processes hitherto known in the art, with regard to construction costs as well as with regard to power costs associated with the operation of the process.

FIG. 2: Performing of the process in a ditch-type basin. Inflow 1 and mixture 2 of return slurry and water are introduced into the inside basin. A tubular propeller 3 causes the contents to assume a horizontal flow current and thereby guarantees a thorough mixing while eliminating deposits at the same time. If necessary, reduced aerating can be maintained in this basin by vents 4.

In the basin wall 8 of the inner basin there is at least one passage opening 5 through which an adjustable amount of fluid can flow into the outer basin.

In the outer basin, the mixture of activated slurry and water is caused to assume a horizontal flow preferably as a result of the tubular propeller 6 and is aerated by the vents 7.

The amount of fluid controlled flows back through the passage opening 9 into inside basin.

This design of the basin permits practically any desired recirculation ratio by computing the passage openings 5 and 9. Additional power for recirculation is not required.

The performing of the process in a ditch-type basin is recommended especially in cases in which existing ditch-type basins have to be restored to operate at full efficiency. With minor structural changes and with a minimum of mechanical components the process can be applied in existing ditch-type basins.

FIG. 3: With respect to FIG. 1, FIG. 3 shows a variant of the design of the passage openings. The openings 5 and 9 are formed by the arrangement of 10 and 1 which are staggered with respect to one another, that is to say, the semicircular partition 11 has a smaller radius than the partition 10. As a result of this design of the passage openings there is no, at the passage site, turbulence in the flow or other resistances unfavorably affecting the horizontal flow process.

It is of course understood that this type of passage opening can also be arranged with ditch-type basins in that the basin wall 8 of FIG. 2 is subdivided into two partitions and the same are arranged in accordance with FIG. 3, to be staggered with respect to one another in such a way that the curvatures situated opposite one another have different radii.

We claim:

1. A process for the performance and control of chemical or biochemical process cycles in at least two series connected reactions stages comprising introducing a liquid flow into a first reaction stage wherein said liquid is brought into substantially horizontally oriented flow by current generating means, said liquid being subjected to controlled gassing by aerator means disposed at the bottom of said first reaction stage; passing a portion of said liquid in said first reaction stage into a second reaction stage, said first and second reaction stage separated by partition means extending throughout the length of said first and second reaction stages and being provided with a continuous passage opening whereby said liquid flows from said first to said second reaction stages, said second reaction stage being characterized by horizontal circulating liquid wherein controlled gassing of said liquid occurs by aerator means disposed at the bottom of said second reaction stage; and recycling a portion of said liquid in said second reaction stage back into said first reaction stage by means of a second continuous passage opening extending throughout the length of said partition means.

2. A process in accordance with claim 1, wherein said continuous passage openings in said partition means are provided by a gap forming displacement in said partition means.

3. A process in accordance with claim 2, wherein said gap forming displacement is provided by the concentric arrangement of said first and second reaction stages separated by said partition means, said partition means provided by a pair of semicircular partitions of unequal radius.

4. A process in accordance with claim 1, wherein said continuous passage openings are controlled by weirs.

5. A process in accordance with claim 1, wherein said continuous passage openings are controlled by valves.

6. A process in accordance with claim 1, wherein said continuous passage openings are controlled by deflectors.

7. A process in accordance with claim 1, wherein horizontal flow is effected by tubular propellers.

8. A process in accordance with claim 1, wherein horizontal flow is effected by paddles.

9. A process in accordance with claim 1, wherein no gassing occurs in said first reaction stage.

10. A process in accordance with claim 1, wherein gassing in said first reaction stages is intermittent.

11. A process in accordance with claim 1, wherein gassing is adjusted so that the oxygen concentration is between 0 and 0.5 milligrams per liter is said first reaction stage and between 0.5 and 3 milligrams per liter in said second reaction stage.

* * * * *